United States Patent
LeBlanc et al.

(10) Patent No.: US 10,628,970 B2
(45) Date of Patent: Apr. 21, 2020

(54) SYSTEM AND METHOD FOR DETERMINING A COLOR VALUE OF A PIXEL

(71) Applicant: SQUARE ENIX, LTD., London (GB)

(72) Inventors: Luc LeBlanc, Montreal (CA); Jean-Francois Dufort, Montreal (CA)

(73) Assignee: SQUARE ENIX LIMITED, London (GB)

( * ) Notice: Subject to any disclaimer, the term of this patent is extended or adjusted under 35 U.S.C. 154(b) by 0 days.

(21) Appl. No.: 15/429,753

(22) Filed: Feb. 10, 2017

(65) Prior Publication Data
US 2018/0144507 A1 May 24, 2018

(30) Foreign Application Priority Data
Nov. 22, 2016 (CA) ..................................... 2949383

(51) Int. Cl.
G09G 5/02 (2006.01)
G06T 11/00 (2006.01)
G06T 11/40 (2006.01)
G06T 15/50 (2011.01)
G06T 1/20 (2006.01)

(52) U.S. Cl.
CPC ............. *G06T 11/001* (2013.01); *G06T 1/20* (2013.01); *G06T 11/40* (2013.01); *G06T 15/503* (2013.01); *G06T 2200/12* (2013.01)

(58) Field of Classification Search
None
See application file for complete search history.

(56) References Cited

U.S. PATENT DOCUMENTS

| 5,363,475 A | * | 11/1994 | Baker | ....................... G06T 1/60 345/422 |
| 5,604,856 A | * | 2/1997 | Guenter | .................. G06T 5/002 345/473 |
| 6,133,901 A | * | 10/2000 | Law | ...................... G06T 11/203 345/611 |
| 6,151,029 A | * | 11/2000 | Shirman | ................. G06T 15/04 345/428 |

(Continued)

OTHER PUBLICATIONS

Yang, L. et al., "Amortized Supersampling", ACM Transactions on Graphics, Dec. 2009, 28(5):1-12.

(Continued)

*Primary Examiner* — Anh-Tuan V Nguyen
(74) *Attorney, Agent, or Firm* — Duane Morris LLP

(57) ABSTRACT

A computer readable medium and an image processing method implemented by a computer processor, for determining a color value for a given pixel of a current frame. The method comprises: selecting, by the computer processor, coordinates of a sample position within the given pixel of the current frame; determining, by the computer processor, a present color value for said sample position coordinates; blending, by the computer processor, the computed color value with a color value for at least one pixel of a previous frame, the at least one pixel of the previous frame including a pixel related to the given pixel; and storing in a memory the blended color value for the given pixel of the frame. Thus, aliasing may be mitigated by dynamically varying the relative contributions of the past and the present to the rendered color value of pixels in a frame.

28 Claims, 10 Drawing Sheets

(56) References Cited

U.S. PATENT DOCUMENTS

| | | | | | |
|---|---|---|---|---|---|
| 7,446,780 | B1* | 11/2008 | Everitt | | G06T 15/50 |
| | | | | | 345/473 |
| 9,251,607 | B1* | 2/2016 | Milne | | G06T 11/203 |
| 2003/0038811 | A1* | 2/2003 | Gritz | | G06T 15/06 |
| | | | | | 345/581 |
| 2003/0043169 | A1* | 3/2003 | Hunter | | G06T 15/503 |
| | | | | | 345/611 |
| 2006/0170682 | A1* | 8/2006 | Van Liere | | G06T 1/60 |
| | | | | | 345/427 |
| 2006/0221090 | A1* | 10/2006 | Takeshima | | G06T 7/11 |
| | | | | | 345/582 |
| 2008/0158428 | A1* | 7/2008 | Ishii | | H04N 9/77 |
| | | | | | 348/663 |
| 2008/0252778 | A1* | 10/2008 | Dunki-Jacobs | | G09G 5/00 |
| | | | | | 348/441 |
| 2009/0091645 | A1* | 4/2009 | Trimeche | | H04N 5/235 |
| | | | | | 348/273 |
| 2010/0013963 | A1* | 1/2010 | Jannard | | H04N 5/3675 |
| | | | | | 348/242 |
| 2010/0061648 | A1* | 3/2010 | Wong | | G06T 5/20 |
| | | | | | 382/260 |
| 2012/0293607 | A1* | 11/2012 | Bhogal | | G06T 3/4038 |
| | | | | | 348/36 |
| 2012/0328189 | A1* | 12/2012 | Usher | | G06F 17/30256 |
| | | | | | 382/165 |
| 2013/0286162 | A1* | 10/2013 | Lee | | H04N 13/189 |
| | | | | | 348/46 |
| 2014/0198945 | A1* | 7/2014 | Hsiao | | G06T 7/20 |
| | | | | | 382/103 |
| 2014/0354675 | A1 | 12/2014 | Lottes | | |
| 2015/0062128 | A1* | 3/2015 | Yoon | | G06T 11/001 |
| | | | | | 345/441 |
| 2015/0178983 | A1* | 6/2015 | Akenine-Moller | | G06T 15/80 |
| | | | | | 345/426 |
| 2015/0193950 | A1* | 7/2015 | Smolic | | G06T 11/001 |
| | | | | | 345/589 |
| 2015/0373235 | A1* | 12/2015 | Chiang | | H04N 5/213 |
| | | | | | 348/241 |
| 2015/0379734 | A1* | 12/2015 | Golas | | G06T 1/60 |
| | | | | | 345/597 |
| 2016/0063751 | A1* | 3/2016 | Kanyuk | | G06T 13/80 |
| | | | | | 345/473 |
| 2016/0071242 | A1* | 3/2016 | Uralsky | | G06T 5/00 |
| | | | | | 345/593 |
| 2016/0253789 | A1* | 9/2016 | Chen | | G06T 5/002 |
| | | | | | 348/241 |
| 2017/0061582 | A1* | 3/2017 | Lim | | G06K 9/6201 |
| 2017/0200253 | A1* | 7/2017 | Ling | | G06T 1/20 |
| 2017/0206638 | A1* | 7/2017 | Fainstain | | G06T 15/503 |
| 2017/0272722 | A1* | 9/2017 | Salvi | | G06T 11/40 |
| 2017/0272744 | A1* | 9/2017 | Liu | | H04N 19/105 |
| 2018/0012068 | A1* | 1/2018 | Tanaka | | G06T 7/20 |
| 2018/0068448 | A1* | 3/2018 | Rastgar | | G06K 9/4652 |
| 2018/0129902 | A1* | 5/2018 | Li | | G06K 9/4671 |

OTHER PUBLICATIONS

Scherzer, D. et al., "Pixel-Correct Shadow Maps with Temporal Reprojection and Shadow Test Confidence", Eurographics Symposium on Rendering, Jan. 2007, 6 pages.

Shinya, M., "Spatio-Temporal Anti-Aliasing by the Pixel-Tracing Method", Systems and Computers in Japan, Nov. 15, 1995,(26)14:54-66.

Extended European Search Report dated Oct. 20, 2017 in corresponding European Patent Application No. 17160328.5 (9 pages).

Karis, B. "High Quality Temporal Supersampling", Presentation at SIGGRAPH2014 Conference, Vancouver, Canada, Aug. 10-14, (presented as early as Aug. 1, 2014), in 55 pages.

Salvi, M.."An Excursion in Temporal Supersampling", Presentation at NVIDIA at GDC 2016 Conference, San Francisco, Mar. 16, 2016, in 56 pages.

Pedersen, Lasse Jon Fuglsang, "Temporal Reprojecion Anti-Aliasing in INSIDE", presentation at GDC 2016 Conference, San Francisco, California, Mar. 16, 2016, in 47 pages.

* cited by examiner

Euclidean distance

SYSTEM AND METHOD FOR DETERMINING A COLOR VALUE OF A PIXEL

TECHNICAL FIELD

The present application relates to image processing and, in particular, to a method of computing color values for pixels of an image frame to mitigate the effect of aliasing.

BACKGROUND

Aliasing is caused by the sampling rate (i.e. number of frames per second) of a scene being too low compared to the transformation speed of objects inside of the scene. This causes objects to appear to jump or suddenly appear at a location instead of giving the impression of smooth motion.

One way to address aliasing is to sample the scene at a higher rate. However, this may push the computing requirements beyond what is available.

Another way to address aliasing is to sample slightly different points within each pixel from one frame to the next, i.e., not always exactly at the center of each pixel. This gives a smoothing effect. However, it can also lead to ghosting, flicker and other undesirable artifacts.

Thus, the industry would welcome an improved approach to dealing with aliasing.

SUMMARY

According to a first aspect, there is provided an image processing method implemented by a computer processor, for determining a color value for a given pixel of a current frame. The method comprises: selecting, by the computer processor, coordinates of a sample position within the given pixel of the current frame; determining, by the computer processor, a present color value for said sample position coordinates; blending, by the computer processor, the computed color value with a color value for at least one pixel of a previous frame, the at least one pixel of the previous frame including a pixel related to the given pixel; and storing in a memory the blended color value for the given pixel of the frame.

According to a first aspect, there is provided a computer-readable medium comprising computer readable instructions which, when executed by a computer processor, cause the computer processor to implement a method for determining a color value for a given pixel of a current frame, the method comprising: selecting coordinates of a sample position within the given pixel of the current frame; determining a present color value for said sample position coordinates; blending the computed color value with a color value for at least one pixel of a previous frame, the at least one pixel of the previous frame including a pixel related to the given pixel; and storing in a memory the blended color value for the given pixel of the frame.

According to a third aspect, there is provided a computer-implemented image processing method, comprising: for a scene element associated with sampling coordinates of a given pixel in a current frame, determining a distance between a position of the scene element in a previous frame and coordinates of the pixel in the previous frame where the scene element appears; and combining past and present color value contributions for the given pixel in a proportion that depends on said distance.

According to a fourth aspect, there is provided a computer-readable medium comprising computer readable instructions which, when executed by a computer, cause the computer to implement an image processing method that comprises: for a scene element associated with sampling coordinates of a given pixel in a current frame, determining a distance between a position of the scene element in a previous frame and sampling coordinates of the pixel in the previous frame where the scene element appears; and combining past and present color value contributions for the given pixel in a proportion that depends on said distance.

Thus, aliasing may be mitigated by dynamically varying the relative contributions of the past and the present to the rendered color value of pixels in a frame.

These and other aspects and features of the present invention will now become apparent to those of ordinary skill in the art upon review of the following description of specific embodiments in conjunction with the accompanying drawings.

It should be understood that the drawings are an aid to understanding certain aspects or embodiments, and are not to be construed as limiting.

DETAILED DESCRIPTION

Figure 1:
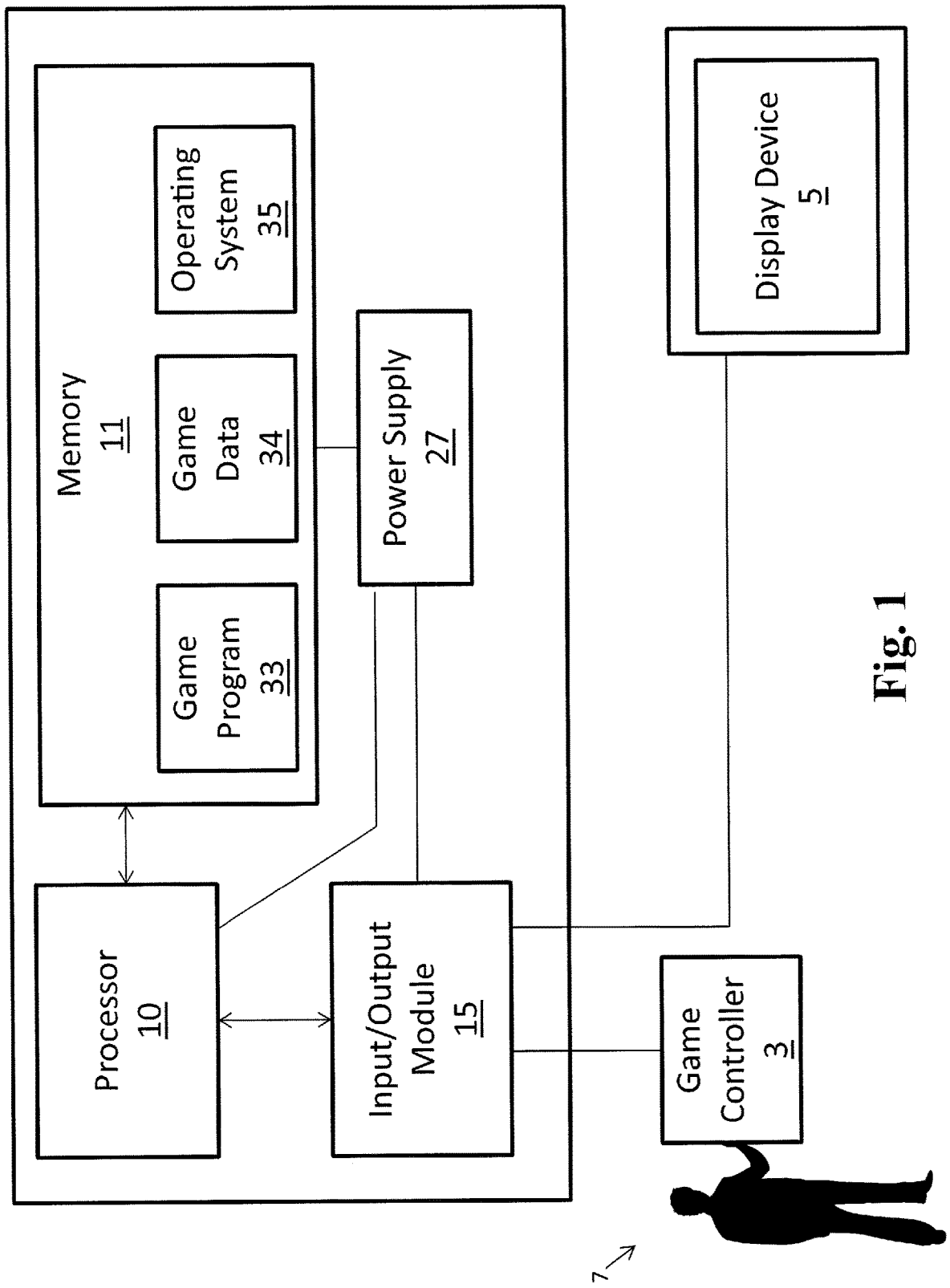
FIG. 1 is a block diagram illustrating a configuration of a game apparatus implementing an example non-limiting embodiment.

FIG. 1 is a block diagram illustrating a configuration of a game apparatus 1 implementing an example non-limiting embodiment of the present invention. In some cases, the game apparatus 1 is a dedicated gaming console similar to an Xbox™, Playstation™, or Nintendo™ gaming console.

In other cases, the game apparatus 1 is a multi-purpose workstation or laptop computer. In still other cases, the game apparatus 1 is a mobile device such as a smartphone. In yet other cases, the game apparatus 1 is a handheld game console.

The game apparatus 1 includes at least one processor 10, at least one computer readable memory 11, at least one input/output module 15 and at least one power supply unit 27, and may include any other suitable components typically found in a game apparatus used for playing video games. The various components of the game apparatus 1 may communicate with each other over one or more buses, which can be data buses, control buses, power buses and the like.

As shown in FIG. 1, a player 7 is playing a game by viewing game images displayed on a screen of the display device 5 and controlling aspects of the game via a game controller 3. Accordingly, the game apparatus 1 receives inputs from the game controller 3 via the at least one input/output module 15. The game apparatus also supplies outputs to a display device 5 and/or an auditory device (e.g., a speaker, not shown) via the at least one input/output module 15. In other implementations, there may be more than one game controller 3 and/or more than one display device 5 connected to the input/output module 15.

The at least one processor 10 may include one or more central processing units (CPUs) having one or more cores. The at least one processor 10 may also include at least one graphics processing unit (GPU) in communication with a video encoder/video codec (coder/decoder, not shown) for causing output data to be supplied to the input/output module 15 for display on the display device 5. The at least one processor 10 may also include at least one audio processing unit in communication with an audio encoder/audio codec (coder/decoder, not shown) for causing output data to be supplied to the input/output module 15 to the auditory device.

The at least one computer readable memory 11 may include RAM (random access memory), ROM (read only memory), flash memory, hard disk drive(s), DVD/CD/Blu-ray™ drive and/or any other suitable memory device, technology or configuration. The computer readable memory 11 stores a variety of information including a game program 33, game data 34 and an operating system 35.

When the game apparatus 1 is powered on, the processor 10 is configured to run a booting process which includes causing the processor 10 to communicate with the computer readable memory 11. In particular, the booting process causes execution of the operating system 35. The operating system 35 may be any commercial or proprietary operating system suitable for a game apparatus. Execution of the operating system 35 causes the processor 10 to generate images displayed on the display device 5, including various options that are selectable by the player 7 via the game controller 3, including the option for the player 7 to start and/or select a video game to be played. The video game selected/started by the player 7 is encoded by the game program 33. The processor 10 is configured to execute the game program 33 such that the processor 10 is able to perform various kinds of information processing functions related to the video game that it encodes. In particular, and with reference to FIG. 2A, execution of the game program 33 causes the processor 10 to execute a game data processing function 22 and game rendering function 24, which are now described.

Figure 2A:
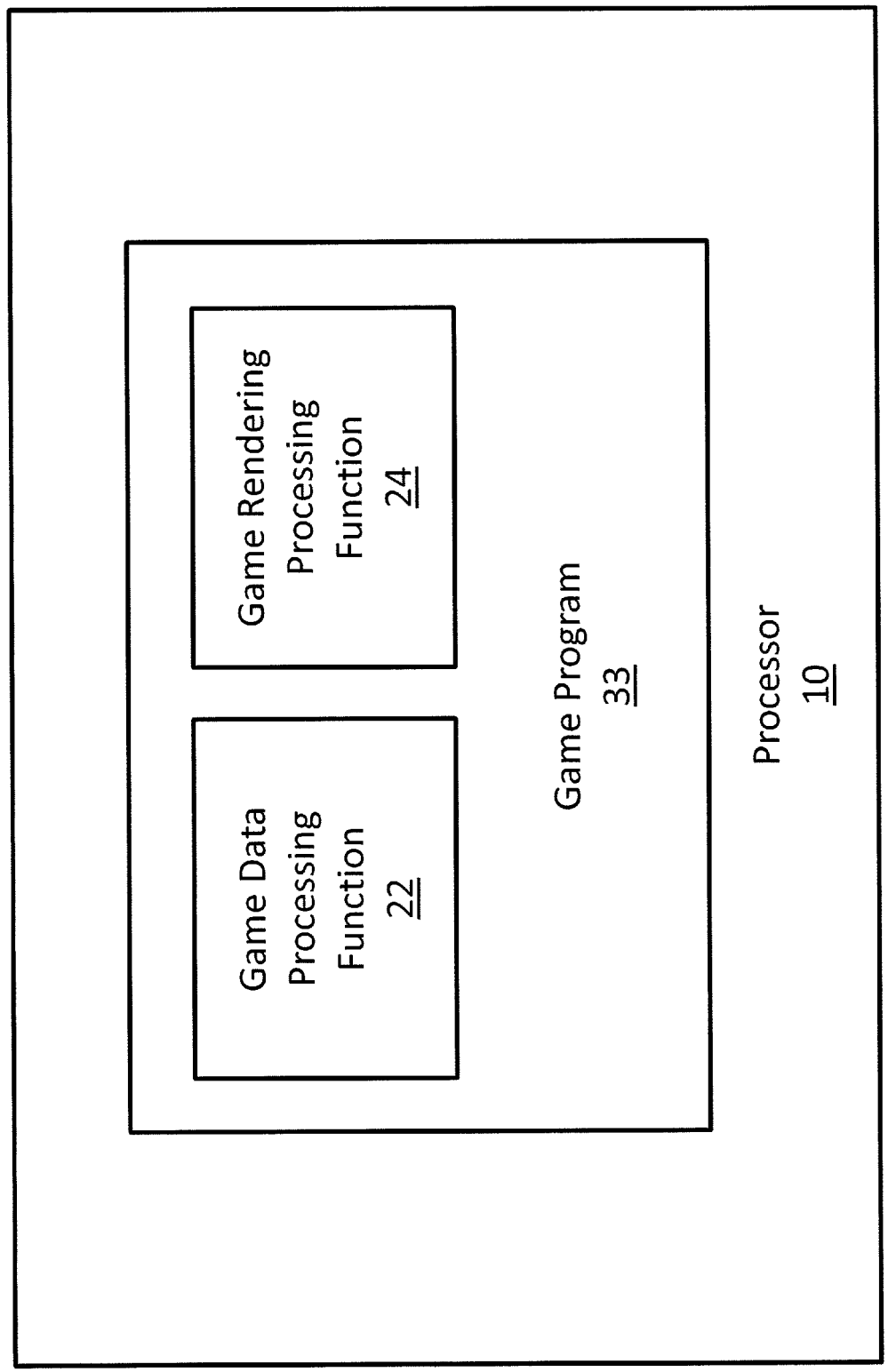
FIG. 2A shows components of a game program executed by the game apparatus of FIG. 1, including a game data processing function and a game rendering function.

The game rendering function 24 includes generation of a game image to be displayed on the display device 5. For its part, the game data processing function 22 includes processing of information representing progress of the game or a current state of the game (e.g., processing of information relating to the game that is not necessarily displayed on the display device 5). The game data processing function 22 and the game rendering function 24 are illustrated in FIG. 2A as forming part of a single game program 33. However, in other embodiments, the game data processing function 22 and the game rendering function 24 may be separate programs stored in separate memories and executed by separate, possibly distant, processors. For example, the game data processing function 22 may be performed on a CPU and game rendering function 24 may be performed on a GPU.

Figure 2B:
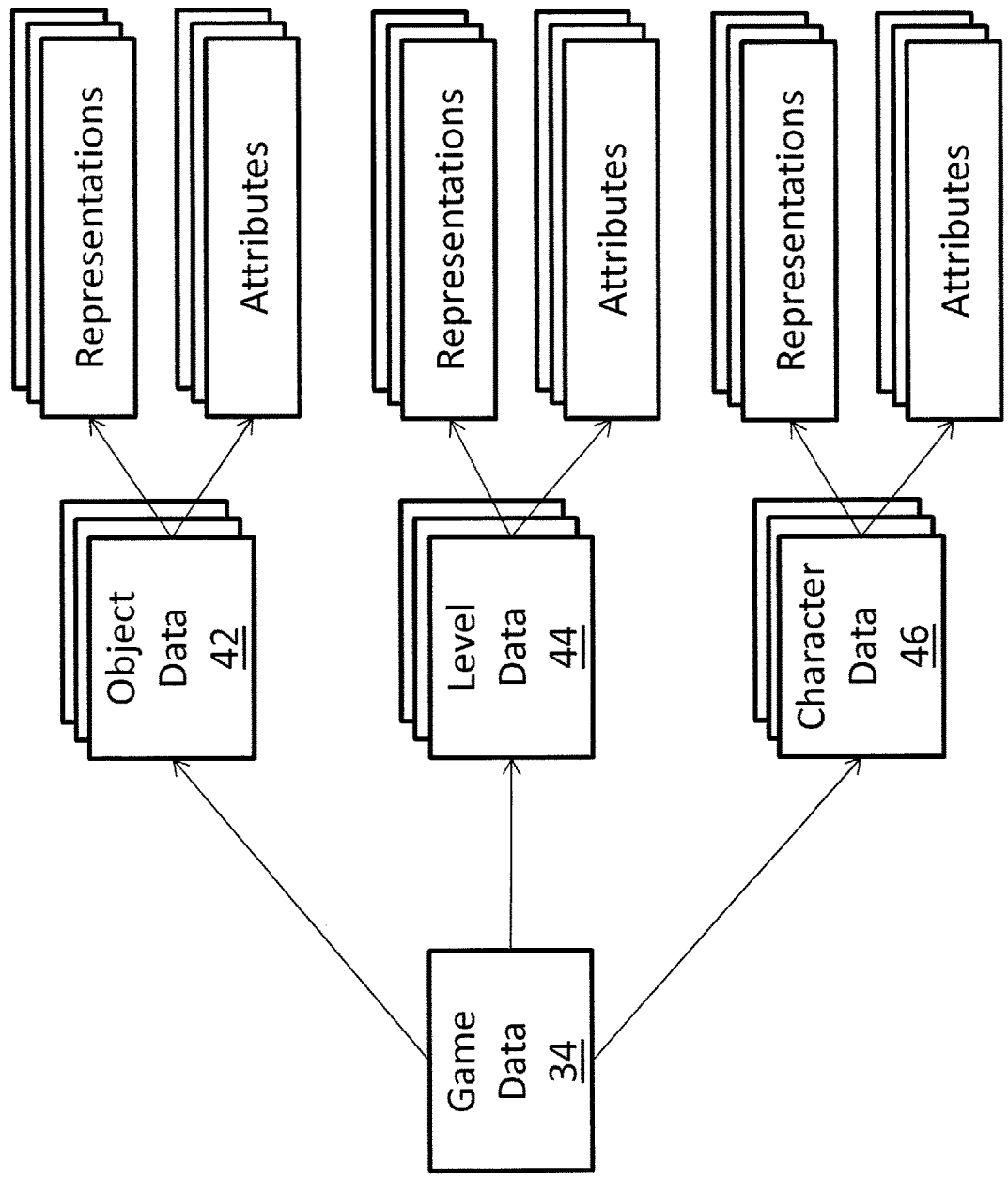
FIG. 2B shows examples of game data according to a present example embodiment.

In the course of executing the game program 33, the processor 10 manipulates constructs such as objects, characters and/or levels according to certain game rules and applying certain artificial intelligence algorithms. In the course of executing the game program 33, the processor 10 creates, loads, stores, reads and generally accesses the game data 34, which includes data related to the object(s), character(s) and/or level(s). FIG. 2B shows examples of game data 34 according to a present example embodiment. The game data 34 may include data related to the aforementioned constructs and therefore may include object data 42, character data 46 and/or level data 44.

An object may refer to any element or portion of an element in the game environment that can be displayed graphically in a game image frame. An object may include 3-dimensional representations of buildings, vehicles, furniture, plants, sky, ground, ocean, sun, and/or any other suitable elements. The object may have other non-graphical representations such as numeric, geometric or mathematical representations. The object data 42 stores data relating to the current representation of the object such as the graphical representation in a game image frame or a numeric, geometric or mathematical representation. The object data 42 may also store attributes such as imaging data, position data, material/texture data, physical state data, visibility data, lighting data (e.g., direction, position, color and/or intensity), sound data, motion data, collision data, environment data, timer data and/or other data associated with the object.

A character is similar to an object except that the attributes are more dynamic in nature and it has additional attributes that objects typically do not have. For example, certain attributes of a playing character may be controlled by the player 7. Certain attributes of a character that is a non-playing character (NPC) may be controlled by the game program 33. Examples of characters include a person, an avatar, an animal, and/or any other suitable object. The character may have other non-visual representations such as numeric, geometric or mathematical representations. A character may be associated with one or more objects such as a weapon held by a character or clothes donned by the character. The character data 46 stores data relating to the current representation of the character such as the graphical representation in a game image frame or a numeric, geometric or mathematical representation. The character data 46 may also store attributes such as imaging data, position data, material/texture data, physical state data, visibility data, lighting data (e.g., direction, position, color and/or intensity), sound data, motion data, collision data, environment data, timer data and/or other data associated with the character.

A level may refer to a specific arrangement of objects within the game environment, through which the characters must navigate. A level may include data regarding paths that may be traveled by characters. A level may also include data that encodes objectives, goals, challenges or puzzles involving the characters and the objects. Although a level has a graphical representation the can be rendered and displayed on a two-dimensional display device such as the display device 5, a level may have other non-visual representations such as numeric, geometric or mathematical representations. Also, there may be multiple levels, each with their own level data 44. The game data 34 may also include data relating to the current view or camera angle of the game (e.g., first-person view, third-person view, etc.) as displayed on the display device 5 which may be part of the representations and/or attributes of the object data 42, level data 44 and/or character data 46.

In executing the game program 33, the processor 10 may cause an initialization phase to occur after the player 7 has selected/started the game, causing initialization of the game. The initialization phase is used to carry out any necessary game setup and prepare the game data 34 for the start of the game. The game data 34 changes during the processing of the game program 33 (i.e., during the playing of the game) and the terminology "game state" is used herein to define the current state or properties of the game data 34 and hence the various object data 42, character data 46 and/or level data 44 and their corresponding representations and/or attributes.

After the initialization phase, the processor 10 in execution of the game program 33 may implement one or more game loops. The one or more game loops run continuously during gameplay causing the game data processing function 22 and the game rendering function 24 to be routinely performed.

A game loop may be implemented where the game data processing function 22 is performed to process the player's input via the game controller 3 and update the game state and afterwards the game rendering function 24 is performed to cause the game image to be rendered based on the updated game state for display on the display device 5. The game loop may also track the passage of time to control the rate of gameplay. It should be appreciated that parameters other than player inputs can influence the game state. For example, various timers (e.g., elapsed time, time since a particular event, virtual time of day, etc.) can have an effect on the game state. In other words, the game keeps moving even when the player 7 isn't providing input and as such the game state may be updated in the absence of the player's input.

In general, the number of times the game data processing function 22 is performed per second specifies the updates to the game state per second (hereinafter "updates per second") and the number of times the game rendering function 24 is performed per second specifies game image rendering per second (hereinafter "frames per second"). In theory the game data processing function 22 and the game rendering function 24 would be called the same number of times per second. By way of a specific and non-limiting example, if the target is 25 frames per second, it would be desirable to have the game data processing function 22 and the game rendering function 24 both being performed every 40 ms (i.e., 1 s/25 FPS). In the case where the game data processing function 22 is performed and afterwards the game rendering function 24 is performed, it should be appreciated that both the game data processing function 22 and the game rendering function 24 would need to be performed in the 40 ms time window. Depending on the current game state, it should be appreciated that the time of performing the game data processing function 22 and/or the game rendering function 24 may vary. If both the game data processing function 22 and the game rendering function 24 take less than 40 ms to perform, a sleep timer may be used before performing the next cycle of the game data processing function 22 and the game rendering function 24. However, if the game data processing function 22 and the game rendering function 24 take more than 40 ms to perform for a given cycle, one technique is to skip displaying of a game image to achieve a constant game speed.

It should be appreciated that the target frames per second may be more or less than 25 frames per second (e.g., 60 frames per second); however, it may be desired that the game data processing function 22 and the game rendering function 24 be performed not less than 20 to 25 times per second so that the human eye won't notice any lag in the rendering of the game image frames. Naturally, the higher the frame rate, the less time between images and the more powerful the processor(s) required to execute the game loop, hence the reliance on specialized processor such as GPUs.

In other embodiments, the game data processing function 22 and the game rendering function 24 may be executed in separate game loops and hence by independent processes. In such cases, the game data processing function 22 may be routinely performed at a specific rate (i.e., a specific number of updates per second) regardless of when the game rendering function 24 is performed and the game rendering function 24 may be routinely performed at a specific rate (i.e., a specific number of frames per second) regardless of when the game data processing function 22 is performed.

It should be appreciated that the process of routinely performing the game data processing function 22 and the game rendering function 24 may be implemented according to various techniques within the purview of the person skilled in the art and that the techniques described in this document are non-limiting examples of how the game data processing function 22 and the game rendering function 24 may be performed.

When the game data processing function 22 is performed, the player input received via the controller 3 (if any) and the game data 34 is processed. More specifically, as the player 7 plays the video game the player 7 inputs various commands via the game controller 3 such as move left, move right, jump, shoot, to name a few examples. In response to the player input, the game data processing function 22 may update the game data 34. In other words, the object data 42, level data 44 and/or character data 46 may be updated in response to player input via the game controller 3. It should be appreciated that not every time that the game data processing function 22 is performed will there be player input via the game controller 3. Regardless of whether player input is received, the game data 34 is processed and may be updated. Such updating of the game data 34 may be in response to representations and/or attributes of the object data 42, level data 44 and/or character data 46 as the representations and/or attributes may specify updates to the game data 34. For example, timer data may specify one or more timers (e.g., elapsed time, time since a particular event, virtual time of day, etc.), which may cause the game data 34 (e.g., the object data 42, level data 44 and/or character data 46) to be updated. By way of another example, objects not controlled by the player 7 may collide (bounce off, merge, shatter, etc.), which may cause the game data 34 e.g., the object data 42, level data 44 and/or character data 46 to be updated in response to a collision.

Figure 2C:
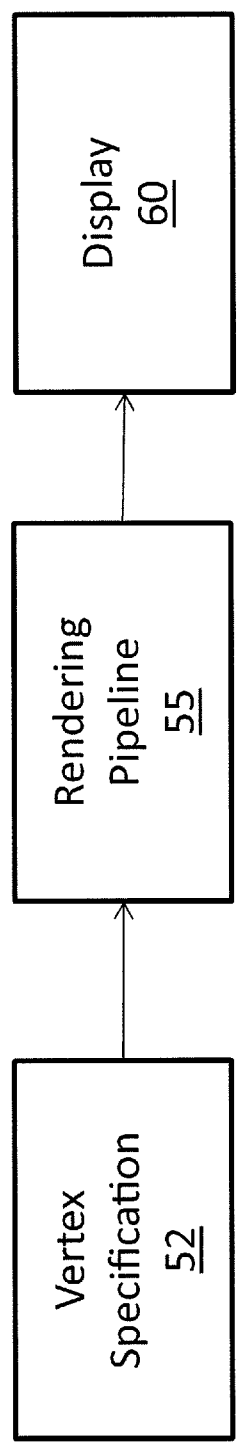
FIG. 2C illustrates an example of a process of converting a 3D graphics scene to a game image for display on a display device.

In general the game data 34 (e.g., the representations and/or attributes of the objects, levels, and/or characters) represents data that specifies a three-dimensional (3D) graphics scene of the game. The process of converting a three-dimensional (3D) graphics scene, which may include one or more 3D graphics objects, into two-dimensional (2D)

rasterized game image for display on the display device 5 is generally referred to as rendering. FIG. 2C illustrates an example process of converting a 3D graphics scene to a game image for display on the display device 5 via the screen. At step 52, the game data processing function 22 processes the data that represents the three-dimensional (3D) graphics scene of the game and converts this data into a plurality of vertex data. The vertex data is suitable for processing by a rendering pipeline 55 (also known as a graphics pipeline). At step 55, the game rendering function 24 processes the vertex according to the rendering pipeline 55. The output of the rendering pipeline 55 is typically pixels for display on the display device 5 via the screen, step 60.

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be send to the rendering pipeline 55. The format of the ordered list typically depends on the specific implementation of the rendering pipeline 55.

At step 55, the game rendering function 24 processes the vertex data according to the rendering pipeline 55. Rendering pipelines are known in the art (e.g., OpenGl, DirectX, etc.); regardless of the specific rendering pipeline used to implement the rendering pipeline 55, the general process of the rendering pipeline 55 is to create a 2D raster representation (e.g., pixels) of a 3D scene. The rendering pipeline 55, in general, calculates the projected position of the vertex data into two-dimensional (2D) screen space and performs various processing which may take into consideration lighting, colour, position information, texture coordinates and/or any other suitable process to derive the game image (e.g., pixels) for output on the display 5 (step 60).

In some cases, the game apparatus 1 is distributed between a server on the internet and one or more internet appliances. Plural players may therefore participate in the same online game, and the functionality of the game program (the game rendering function and/or the game data processing function) may be executed at least in part by the server.

Figure 3:
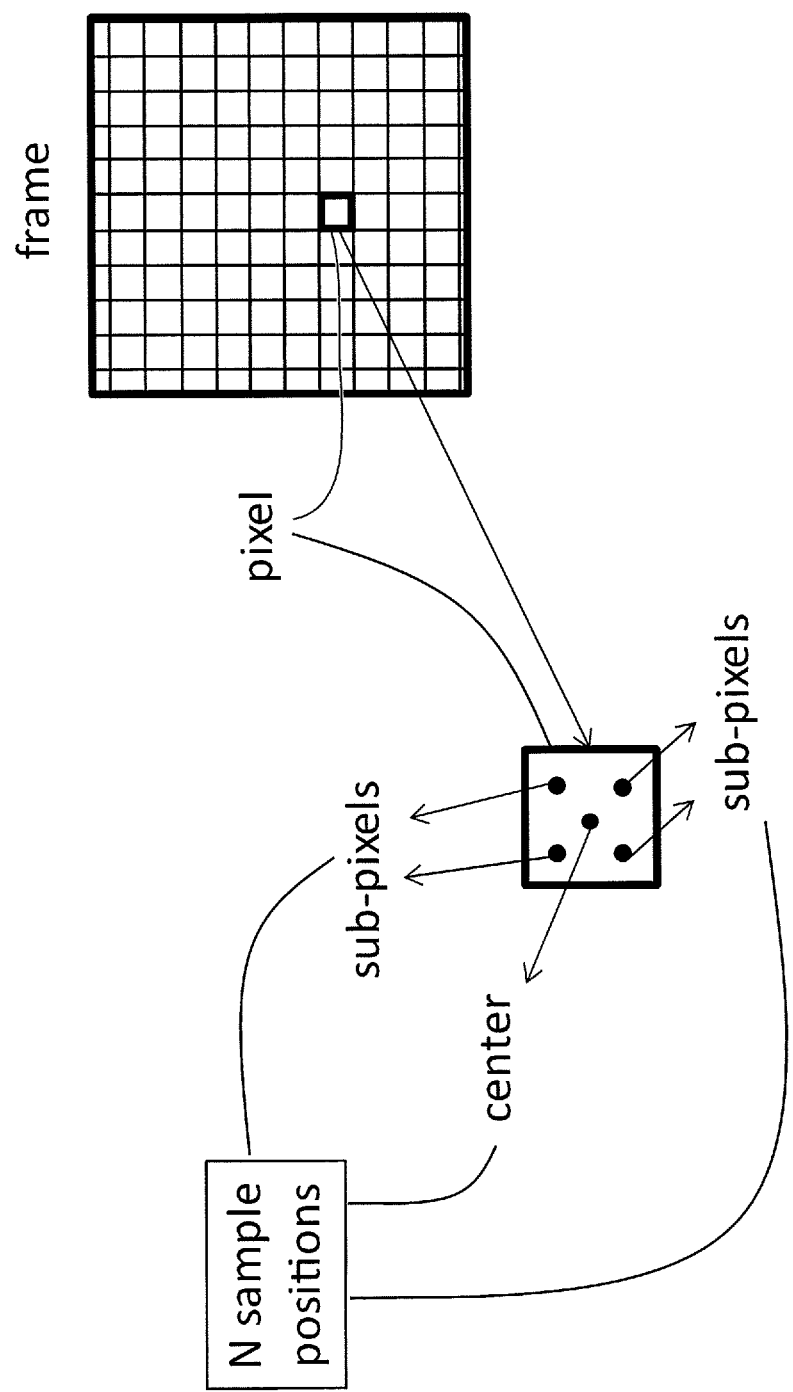
FIG. 3 is a diagram illustrating sample positions of sub-pixels within a pixel of an image frame, according to an example embodiment.

An embodiment of the game rendering function 24 may implement an image processing method as will now be described in greater detail. Specifically, with reference to FIG. 3, each pixel of an image frame is associated with N relative sample positions. One of these relative sample positions may correspond to a pixel center, which can be expressed using, e.g., 2-D coordinates. The other N−1 relative sample positions may correspond to N−1 sub-pixels in the vicinity of the pixel center and still considered "part" of the pixel. In one implementation, N−1=4, which gives a total of N=5 possible relative sample positions associated with each pixel. Example positions include "center", "top-right", "top-left", "bottom-right" and "bottom-left". Other numbers of relative sample positions are of course possible, and their distribution within a pixel may be regular or irregular.

Figure 4:
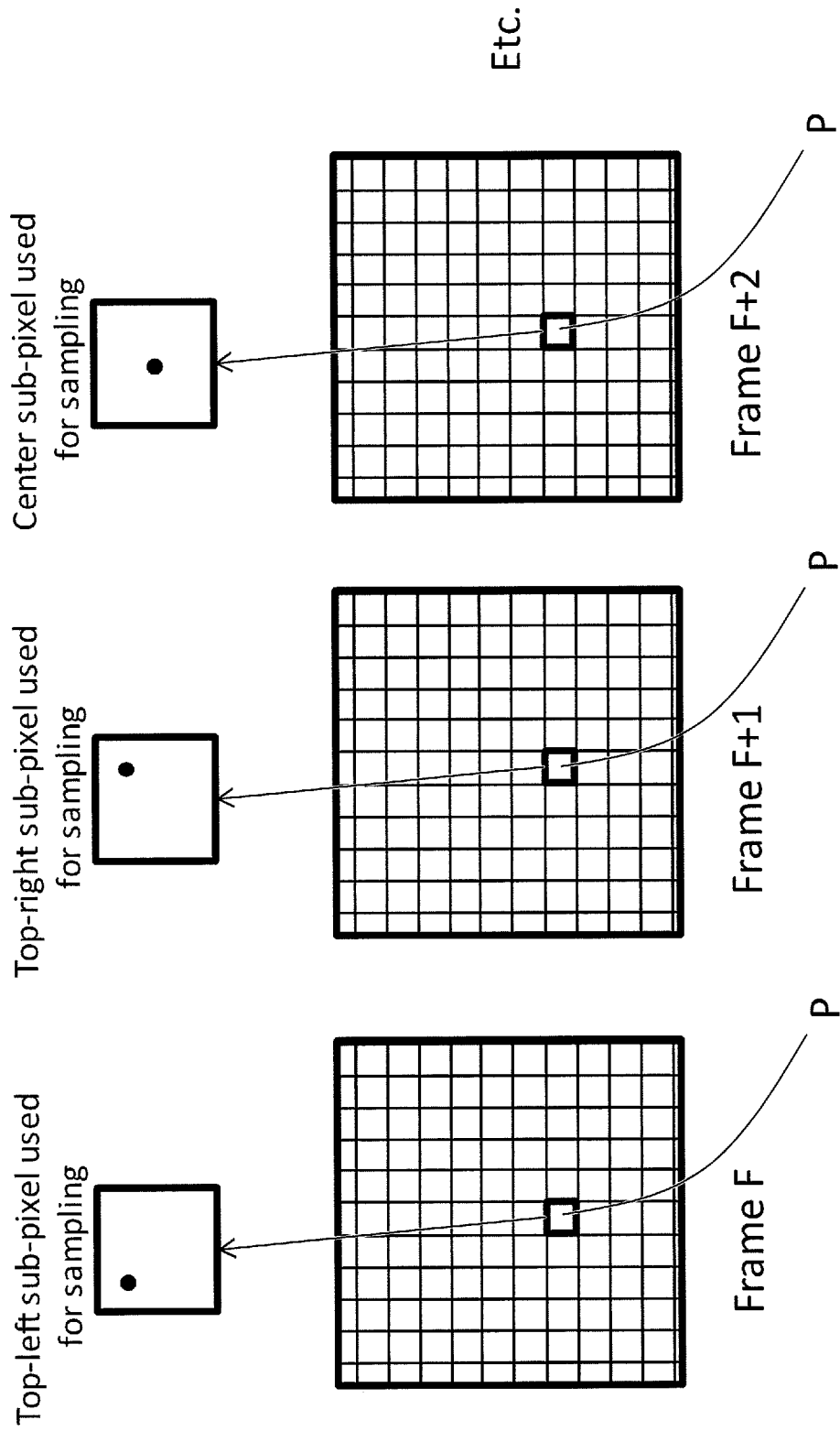
FIG. 4 is a diagram illustrating changes in the sub-pixel used for sampling the corresponding pixel for each frame in a succession of frames, according to an example embodiment.

When applying temporal anti-aliasing, the color value used to render a pixel P, over a sequence of frames F, F+1, . . . , F+2, is computed as follows (see FIG. 4):

For a first frame in the sequence (namely F), the processor 10 computes the color value for a first one of the N relative sample positions (the position of either the pixel center or one of the N−1 sub-pixels);

For a second frame in the sequence (namely F+1), the processor 10 computes the color value for a second one of the N relative sample positions;

For a third frame in the sequence (namely F+2), the processor 10 computes the color value for a third one of the N relative sample positions, and so on for each subsequent frame, until the N+1th frame in the sequence, at which point the cycle of N relative sample positions is exhausted and starts over.

Therefore, it is noted that pixel P is "sampled" at different ones of the sample positions for each successive frame. Of course, the process is performed for the other pixels within the various frames, with all pixels of a common frame being sampled at the same relative sample position within the respective pixel.

To simplify the present description, the color value used to render pixel P in frame F will be denoted T(P;F). This "rendered color value" will be a blend (e.g., a normalized linear combination) of a "present contribution" and a "past contribution". The present contribution may include a "present color value" for pixel P and frame F (denoted C(P;F)). The present color value is the instantaneous color value computed based on current scene geometry and lighting. For its part, the past contribution may include the previously computed rendered color value(s) of one or more pixels in the neighborhood of a related pixel (denoted P#) in the previous frame F−1. This past contribution can be denoted T_COMB(P#;F−1) and stored in an accumulation buffer in the memory 11, for example.

Of note is the fact that related pixel P# may include pixel P or may exclude it, depending on how much the underlying image has changed in the vicinity of pixel P between frame F−1 and frame F. (Changes could be the result of movement in the scene or movement of the camera.) Also of note is that the relative sample position used to sample related pixel P# (and the one or more pixels in the neighborhood of related pixel P#), is different from the relative sample position used to sample pixel P.

Figure 5:
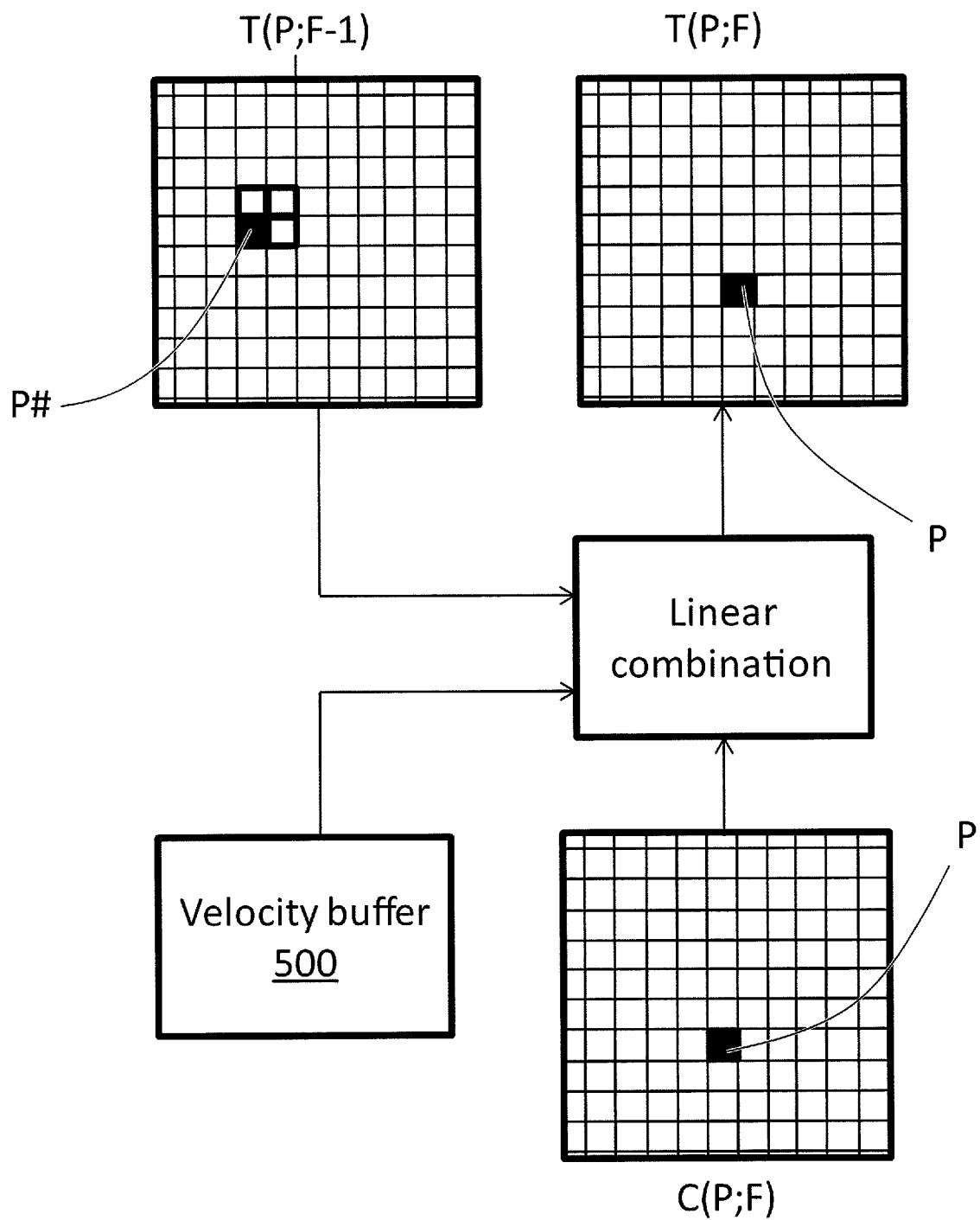
FIG. 5 is a diagram illustrating computation of a rendered color value based on present and past contributions, according to an example embodiment.

Thus, and with additional reference to FIG. 5, the rendered color value for pixel P in frame F can be expressed by the following equation:

$$T(P; F) = [W] * \text{PAST} + [1 - W] * \text{PRESENT}$$
$$= [W] * T\_COMB(P\#; F-1) + [1 - W] * C(P; F)$$

The above equation, which in this example is a linear combination but this need not generally be the case, brings to light two notions that may benefit from further description. First is the notion of determining the distribution of [W] and [W−1], i.e., the relative contributions of the past and the present. Second is the notion of determining the past contribution T_COMB(P#;F−1). It is noted that this quantity is not equivalent to the rendered color value for pixel P in frame F−1, nor is it equivalent to the rendered color value for related pixel P# in frame F−1. Rather, it is a linear combination of rendered color values related pixel P# and zero, one or more other pixels in the neighborhood of related pixel P#, as will be later described.

Determining the Relative Contributions of the Past and the Present

The actual coordinates at which pixel P is sampled within frame F may be denoted S(P;F). It is one of N possibilities for pixel P (corresponding to the N relative sample positions) and thus depends on where frame F falls in the sequence of frames. It also is associated with a point on an underlying object (or "scene element") in the game. Thus, different coordinates at which the same pixel is sampled (of which there may be 2, 4, 5, 9, . . . ) may be associated either with different points on the same underlying object or with points on different underlying objects. A velocity buffer 500 (see FIG. 5), which may be part of the memory 11, associates the various possible sample coordinates for the current frame with a projected distance and direction where the exact point on the underlying object located at those coordinates would have appeared in the previous frame, assuming that the underlying object had been present in the previous frame. In other embodiments, the velocity buffer 500 may store, for each set of possible sample coordinates of the current frame, the actual coordinates where the exact point on the underlying object located at those sample coordinates would have appeared in the previous frame. Computation of the contents of the velocity buffer 500 may be carried out by the processor 10 based at least partly on the game data 34. It should be noted that in computing a projected distance and direction where an exact point on the underlying object located at certain sample coordinates for the current frame would have appeared in the previous frame, the processor 10 may compensate for the change in relative sampling coordinates between the present and previous frames. In other words, if nothing in the scene changes and the camera does not move, the projected distance from the current sampling position will always lead to the same point. In other words, changes in the sampling position imply changes in the distance, so that the same coordinates in the previous frame are pointed to.

Figure 6:
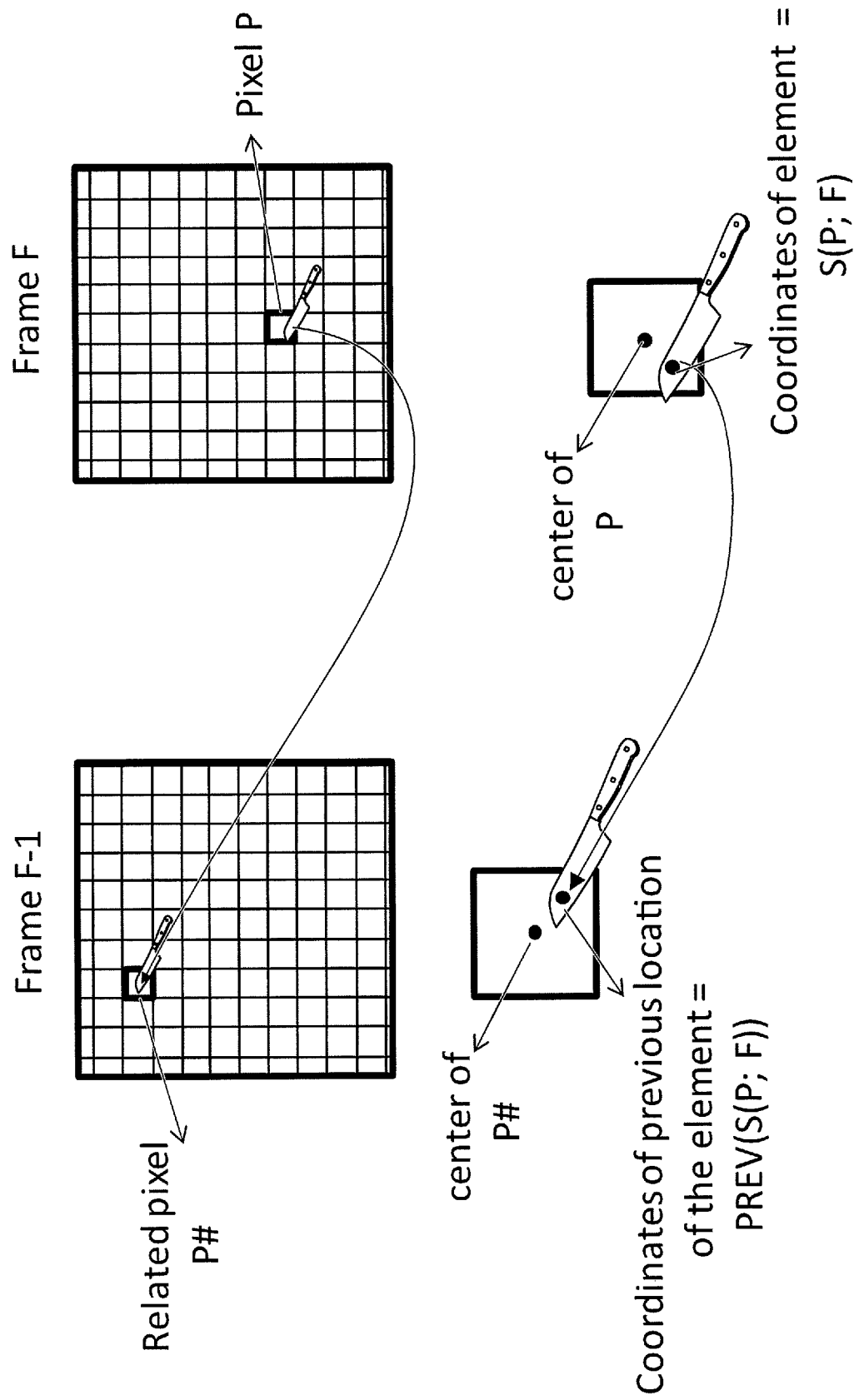
FIG. 6 shows changes in the coordinates of a scene element as defined by contents of a velocity buffer, according to an example embodiment.

In accordance with a non-limiting embodiment, the relative distribution of past and present (i.e., [W] and [1−W] in the aforesaid equation) changes from pixel to pixel and from frame to frame, depending on various factors. In particular, considering pixel P and frame F, one such key factor is the distance between (i) the position at which one finds, in frame F−1, the point on the underlying object corresponding to where pixel P is being sampled in frame F and (ii) the center of the pixel in frame F−1 that contains this position. Stated differently, the relative distribution of past and present depends on the distance between the "previous position of the scene element occupying the current sample coordinates" and the center of the pixel containing that previous position. This is now described with reference to FIG. 6.

As mentioned above, the coordinates where pixel P is currently being sampled in frame F can be denoted S(P;F). In this example, S(P;F) corresponds to the bottom-right sub-pixel of pixel P. There is a scene element at these coordinates, which in this case is a point near a tip of a knife blade. This scene element has a "previous position", i.e., a position within the previous frame F−1. In particular, the previous position of the scene element occupying the current sample coordinates for pixel P in frame F is denoted PREV(S(P;F)) and the pixel containing PREV(S(P;F)) is denoted P#. Thus, pixel P# in frame F−1 (see FIG. 6) is referred to as the "related pixel" to pixel P in frame F.

It will be appreciated that the "previous position of the scene element occupying the current sample coordinates", which has been denoted PREV(S(P;F)), may be obtained by consulting the velocity buffer 500, as this is where information about object movement (including the object associated with the scene element in question) is stored. It is noted that PREV(S(P;F)) may, but does not necessarily, correspond to one of the relative sample positions (e.g., the position of a pixel center or a sub-pixel). For example, in FIG. 6, the point near the tip of the knife blade occupying the "bottom-left" relative sample position in pixel P in frame F does appear to occupy the "bottom-right" relative sample position in related pixel P# in frame F−1. However, that very same scene element (the point near the knife blade tip) could have occupied another point in related pixel P# without it necessarily having been one of the pre-determined relative sample positions (of which there are five in this non-limiting example).

The distance between PREV(S(P;F)) and the center of related pixel P# may be a factor in determining W and [1−W] in the aforesaid equation. In this example embodiment, the closer PREV(S(P;F)) is to the center of related pixel P#, the more weight will be given to the past contribution. Conversely, the further PREV(S(P;F)) is from the center of P#, the less weight will be given to the past contribution and the more weight will be given to the present contribution. The value of the coefficient W that characterizes the past contribution may thus be in the neighborhood of between 0.75 and 0.95, depending on the aforementioned factors. Other ranges are of course possible.

Stated differently, the amount of weight given to the past contribution fluctuates depending on how closely the previous position of the point on the corresponding object occupying the current sample coordinates (compensated for the frame-to-frame difference in relative sampling position, as described above) is to the center of a pixel. Nevertheless, no matter how great this distance, it may be desirable to always give at least some non-zero weight to the past contribution.

Determining the Past Contribution T_COMB(P#;F−1)

As mentioned above, the past contribution T_COMB(P#; F−1) is a linear combination of previously rendered color values for related pixel P# and zero, one or more additional pixels in the neighborhood of related pixel P#. In particular, there may be M such additional pixels in the neighborhood of related pixel P#. This number may range from, say, 0 to 9, for example, depending on operational requirements and also depending on PREV(S(P;F)).

Specifically, when PREV(S(P;F)) is exactly at the center of related pixel P#, then one may set M=0 and the entire past contribution belongs to related pixel P# and no other previously rendered color values are needed. In that case, $$T\_COMB(P\#;F-1) = T(P\#;F-1).$$

On the other hand, when PREV(S(P;F)) is not exactly at the center of related pixel P#, then one has M>0, and the way in which the past color value of related pixel P# and of the M other pixels in the vicinity of PREV(S(P;F)) are combined to yield T_COMB(P#;F−1) is given by a linear combination:

$$T\_COMB(P\#; F-1) = a0 * T(P\#; F-1) + \sum_{i=1}^{M}(ai * T(P\#i; F-1))$$

where the various P#i denote pixels other than related pixel P# that are in its neighborhood, but more particularly in the vicinity of PREV(S(P;F)).

Figure 7:
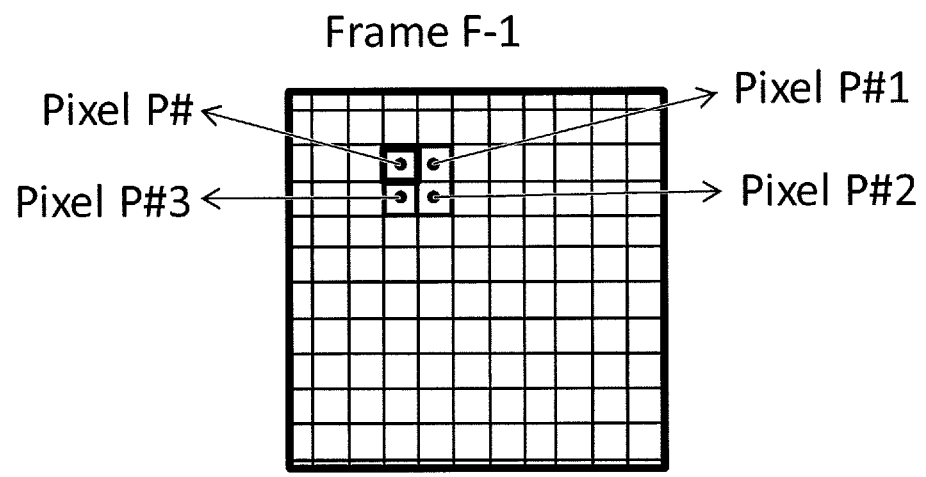
FIG. 7 is a diagram illustrating the presence of a related pixel of a previous frame, together with additional pixels in its vicinity, according to an example embodiment.

For example, in FIG. 7, P#1, P#2 and P#3 denote pixels other than P# that are in the vicinity of PREV(S(P;F)).

The value of each of the M+1 aforesaid coefficients (a0, a1, ..., aM) of the linear combination can be selected on the basis of the relative distance (d0, d1, ..., dM) between PREV(S(P;F)) and the center or an edge of the corresponding pixel (P#, P#1, ..., P#M).

Figure 8:
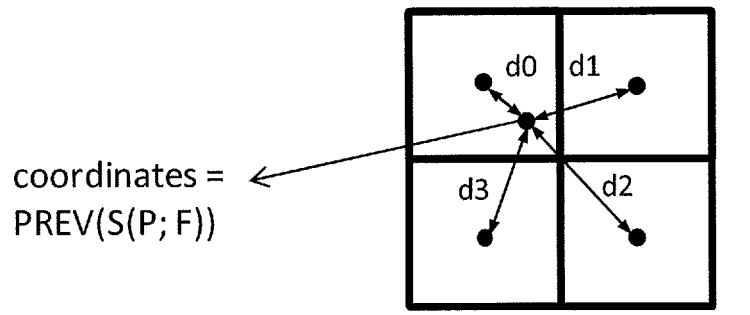
FIG. 8 illustrates computation of a Euclidean distance between coordinates of a scene element and the center of each of a plurality of pixels in its vicinity, according to an example embodiment.
Figure 9:
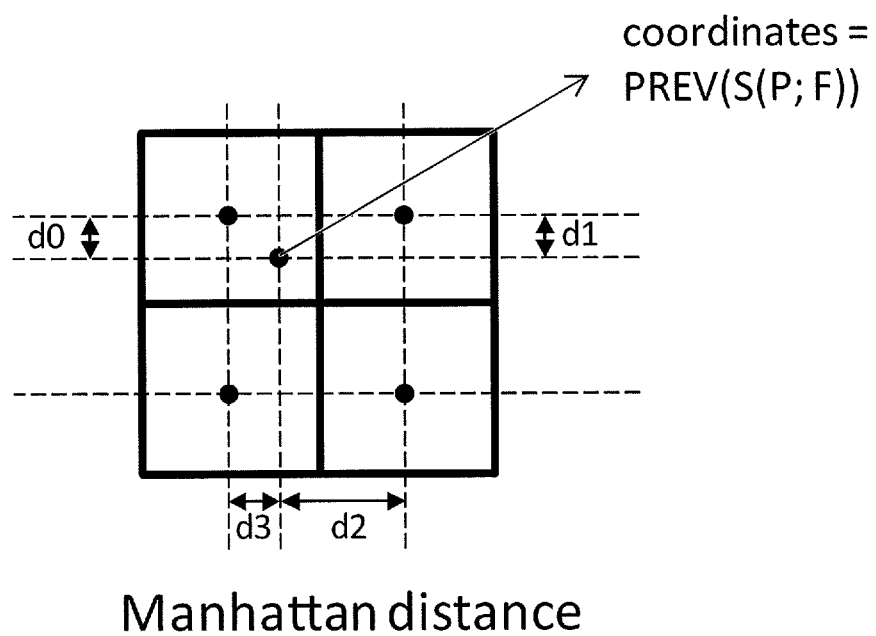
FIG. 9 illustrates computation of a Manhattan distance between coordinates of a scene element and the center of each of a plurality of pixels in its vicinity, according to an example embodiment.

In two non-limiting examples, the relative distance could be assessed based on the Euclidean distance (see FIG. 8) or the Manhattan distance (see FIG. 9), depending on operational requirements.

In some embodiments, the coefficients (a0, a1, ..., aM) of the linear combination T_COMB(P#;F−1) may be normalized to always sum to 1.

Also, combinations other than linear combinations could be used.

In a variant, one may look to more than one past frame when determining the past contribution.

While the above description and diagrams have provided a description and illustration of several example embodiments, it should be appreciated that variations are possible while remaining within the scope of the invention. For example, certain elements that are expected to be known or common to a person of ordinary skill in the art have not been described, while certain features that have been described may be omitted in some embodiments and included in others. Those skilled in the art will of course appreciate that the invention is only to be limited by the claims attached hereto.

We claim:

1. An image processing method implemented by a computer processor, for determining a color value for a given pixel of a current frame, comprising:
   selecting, by the computer processor, sampling position coordinates within the given pixel of the current frame;
   determining, by the computer processor, a present color value for a scene element located at said sampling position coordinates;
   blending, by the computer processor, the present color value and a second color value, wherein the second color value is a color value for at least one pixel of a previous frame, wherein the at least one pixel of the previous frame includes a related pixel that is a pixel of the previous frame that includes the scene element located at the sampling position coordinates of the current frame; wherein blending the present color value and the second color value comprises computing a linear combination of the present color value and the second color value, wherein the present color value and the second color value each has a respective relative contribution to the linear combination, wherein the relative contribution depends on a distance between: (i) the position of the scene element in the related pixel in the previous frame, and (ii) coordinates within the related pixel in the previous frame, such that the closer the position of the scene element in the related pixel in the previous frame is to the coordinates within the related pixel in the previous frame, the more weight is given to the contribution of the second color value and the less weight is given to the contribution of the present color value, and wherein the relative contribution does not depend upon any distance between the sampling position coordinates and coordinates within the given pixel of the current frame; and
   storing in a memory the blended color value for the given pixel of the current frame.

2. The image processing method defined in claim 1, wherein the related pixel is related to the given pixel by contents of a velocity buffer.

3. The image processing method defined in claim 2, wherein the velocity buffer stores information regarding movement of the scene element between the current and previous frames.

4. The image processing method defined in claim 2, wherein the velocity buffer stores information regarding a position of the scene element in the previous frame.

5. The image processing method defined in claim 2, wherein the related pixel includes the given pixel.

6. The image processing method defined in claim 2, wherein the related pixel does not include the given pixel.

7. The image processing method defined in claim 1, wherein said coordinates within the related pixel in the previous frame define a center of the related pixel in the previous frame, such that the closer the position of the scene element in the related pixel in the previous frame is to the center of the related pixel in the previous frame, the more weight is given to the contribution of the second color value and the less weight is given to the contribution of the present color value in the linear combination.

8. The image processing method defined in claim 1, wherein the at least one pixel of the previous frame comprises a plurality of pixels including the related pixel and at least one additional pixel of the previous frame adjacent the related pixel.

9. The image processing method defined in claim 8, wherein the second color value comprises a combined color value for the plurality of pixels including the related pixel and the at least one additional pixel.

10. The image processing method defined in claim 9, further comprising determining the combined color value for the plurality of pixels.

11. The image processing method defined in claim 10, wherein determining the combined color value for the plurality of pixels comprises linearly combining the color values of the related pixel and the at least one additional pixel in the previous frame according to respective coefficients.

12. The image processing method defined in claim 11, wherein the coefficients are normalized to sum to unity.

13. The image processing method defined in claim 11, wherein the respective coefficients reflect a distance between a position of the scene element in the previous frame and a center of the respective pixel in the previous frame.

14. The image processing method defined in claim 11, wherein the respective coefficients reflect a distance between a position of the scene element in the previous frame and an edge of the respective pixel in the previous frame.

15. The image processing method defined in claim 11, wherein the respective coefficients reflect a distance between a position of the scene element in the previous frame and the coordinates within the respective pixel in the previous frame.

16. The image processing method defined in claim 1, further comprising repeating the selecting, determining, blending and storing for multiple pixels in the current frame and rendering the current frame using the stored color values for the multiple pixels.

17. The image processing method defined in claim 1, further comprising rendering an image frame from the blended color values for an array of pixels stored in the memory.

18. The image processing method defined in claim 17, further comprising carrying out the selecting, determining and blending at a sufficiently high rate to produce at least 25 image frames per second.

19. A non-transitory computer-readable medium comprising computer readable instructions which, when executed by a computer processor, cause the computer processor to implement a method for determining a color value for a given pixel of a current frame, the method comprising:
   selecting sampling position coordinates within the given pixel of the current frame;
   determining a present color value for a scene element located at said sampling position coordinates;
   blending the present color value and a second color value, wherein the second color value is a color value for at least one pixel of a previous frame, wherein the at least one pixel of the previous frame includes a related pixel that is a pixel of the previous frame that includes the scene element located at the sampling position coordinates of the current frame; wherein blending the present color value and the second color value comprises computing a linear combination of the present color value and the second color value, wherein the present color value and the second color value each has a respective relative contribution to the linear combination, wherein the relative contribution depends on a distance between: (i) the position of the scene element in the related pixel in the previous frame, and (ii) coordinates within the related pixel in the previous frame, such that the closer the position of the scene element in the related pixel in the previous frame is to the coordinates within the related pixel in the previous frame, the more weight is given to the contribution of the second color value and the less weight is given to the contribution of the present color value, and wherein the relative contribution does not depend upon any distance between the sampling position coordinates and coordinates within the given pixel of the current frame; and
   storing in a memory the blended color value for the given pixel of the current frame.

20. The non-transitory computer-readable medium of claim 19, wherein said coordinates within the related pixel in the previous frame define a center of the related pixel in the previous frame, such that the closer the position of the scene element in the related pixel in the previous frame is to the center of the related pixel in the previous frame, the more weight is given to the contribution of the second color value and the less weight is given to the contribution of the present color value in the linear combination.

21. A computer-implemented image processing method, comprising:
   for a scene element located at sampling position coordinates of a given pixel in a current frame, determining a distance between: (i) a position of the scene element in a previous frame, and (ii) coordinates of a pixel in the previous frame occupied by the scene element; and
   combining past and present color value contributions for the given pixel in a proportion that depends on said distance, such that the closer the position of the scene element in the previous frame is to the coordinates of the pixel in the previous frame occupied by the scene element, the more weight is given to the past color value contribution and the less weight is given to the present color value contribution, and wherein the proportion does not depend upon any distance between the sampling position coordinates and coordinates within the given pixel in the current frame.

22. The computer-implemented image processing method defined in claim 21, wherein said coordinates of the pixel in the previous frame occupied by the scene element define a center of the pixel in the previous frame where the scene element appears, such that the closer the position of the scene element in the previous frame is to the center of the pixel in the previous frame, the more weight is given to the past color value contribution and the less weight is given to the present color value contribution.

23. The computer-implemented image processing method defined in claim 21, wherein the distance is a Euclidean distance.

24. The computer-implemented image processing method defined in claim 21, wherein the distance is a Manhattan distance.

25. A non-transitory computer-readable medium comprising computer readable instructions which, when executed by a computer, cause the computer to implement an image processing method that comprises:
   for a scene element located at sampling position coordinates of a given pixel in a current frame, determining a distance between: (i) a position of the scene element in a previous frame, and (ii) coordinates of a pixel in the previous frame occupied by the scene element; and
   combining past and present color value contributions for the given pixel in a proportion that depends on said distance, such that the closer the position of the scene element in the previous frame is to the coordinates of the pixel in the previous frame occupied by the scene element, the more weight is given to the past color value contribution and the less weight is given to the present color value contribution, and wherein the proportion does not depend upon any distance between the sampling position coordinates and coordinates within the given pixel in the current frame.

26. The non-transitory computer-readable medium defined in claim 25, wherein said coordinates of the pixel in the previous frame occupied by the scene element define a center of the pixel in the previous frame where the scene element appears, such that the closer the position of the scene element in the previous frame is to the center of the pixel in the previous frame, the more weight is given to the past color value contribution and the less weight is given to the present color value contribution.

27. The non-transitory computer-readable medium defined in claim 25, wherein the distance is a Euclidean distance.

28. The non-transitory computer-readable medium defined in claim 25, wherein the distance is a Manhattan distance.

* * * * *